June 3, 1969    G. B. STILLWAGON, JR    3,447,232
UNIVERSAL JOINT PINNING CONSTRUCTION
Original Filed Jan. 7, 1965

INVENTOR.
GEORGE B. STILLWAGON JR.
BY
HIS ATTORNEYS

United States Patent Office 3,447,232
Patented June 3, 1969

3,447,232
UNIVERSAL JOINT PINNING CONSTRUCTION
George B. Stillwagon, Jr., Dayton, Ohio, asisgnor of one-half to Kenneth G. Fraser, Green Valley, Ariz.
Original application Jan. 7, 1965, Ser. No. 423,918. Divided and this application Sept. 5, 1967, Ser. No. 665,348
Int. Cl. B23p 19/00, 19/02; F16d 3/26
U.S. Cl. 29—434
5 Claims

ABSTRACT OF THE DISCLOSURE

One longer pin is inserted within a bore of a bearing block with a heavy forced fit and two shorter, tubular pins are inserted with a heavy forced fit into opposite ends of a transverse bore in the same bearing block. The pins are prepared for insertion into the bores by the application of a phosphate coating to prevent galling or contact welding and by vibratory deburring to prevent scraping. The shorter pins abut against flats on the longer pin in the center of the bearing block and a fourth pin is inserted through aligned bores in the three pins. Rotational alignment of the longer pin about its axis is obtained by supporting it with the desired rotational alignment while simultaneously forcing it into its bore by a distance sufficient to cause it to be firmly gripped by the bearing block metal. The support for the longer pin is then released and the pin is forced the remaining desired distance into the bore.

---

This application is a division of copending application Ser. No. 423,918 filed Jan. 7, 1965 and now abandoned.

The present invention relates to an improved universal joint pinning construction and to the method of producing same.

This invention is an improvement upon the universal joint described in U.S. Letters Patent No. 2,369,810, issued Feb. 20, 1945, to George B. Stillwagon, Jr. In that patent there is disclosed a universal joint wherein a first coupling member having spaced jaws at one end thereof receives opposite faces of a bearing block between said jaws and wherein a second coupling member also provided with spaced jaws receives opposite but different faces of the bearing block. The bearing block is pivotally connected to the coupling members by means of pivot pins passing through the several jaws of the coupling members and into the faces of the bearing block. In the aforesaid patent, the pivot pins comprise a first pin passing entirely through the bearing block and second half pins or bushings passing into opposite faces of the block to engage the first pin at right angles to the axis of the first pin. The half pins or bushings and the first pin are all secured within the block by a locking element or rivet which passes through the bushings and through an aperture in the first pin and is upset at its ends. The upset ends of the rivet retain the bushings against removal from the bearing block and the passage of the rivet through the body of the first pin retains the first pin against removal from the bearing block.

In the operation of a universal joint such as that depicted in the aforesaid patent, the first and second coupling members are permitted to pivot one relative to the other by virtue of the pivotal connections established between the jaws of the connecting members and the pivot pins of the bearing block. Ordinarily, the universal joint is employed to transmit a substantial torque between the first and second coupling members and, accordingly, the pivotal action of the jaws of the coupling members on their respective pivot pins is accompanied by substantial radial forces applied to the pivot pins. Thus, the coupling members tend to bend and simultaneously twist the pivot pins.

The action is somewhat analogous to the manipulations employed to remove a bottle cork from a bottle. Thus, to remove the cork, the cork is grasped by the hand and twisted within the bottle opening while at the same time bending forces are applied to the cork to cause the cork to work out of the bottle opening. It is found that the pivot pins display a similar tendency to work out of the bearing block, especially when subjected to alternating clockwise and counter-clockwise loading.

With the construction disclosed in the aforesaid patent, the first pivot pin, which extends entirely through the bearing block, displays no tendency to work out of the bearing block. This is because the opposite ends of this pivot pin receive equal and opposite forces from the jaws of said first coupling member and the tendency for one end of the pivot pin to work out of the bearing block in one direction is opposed by an equal tendency for the other end of the pivot pin to work out of the bearing block in the opposite direction. For this reason, the first pivot pin is easily retained within the bearing block under normal operating conditions and the simple rivet retaining this pin in the patented construction has proved adequate.

Since the first pivot pin is exposed only to counter-balanced forces, it has been the practice to employ a "snug" fit between the first pivot pin and the bore of the bearing block which receives the first pivot pin.

The characterization of the fit as a "snug" fit is in conformity with the applicable ASA standards which describe a snug fit as "the closest fit that can be assembled by hand."

The use of a snug fit between the first pivot pin and the corresponding bore of the bearing block has been considered desirable partly because of the manufacturing steps involved. Thus, in assembling the pivot pins in the bearing block it is necessary to align an aperture passing transversely through the center of the first pivot pin with corresponding apertures passing through the bushings or half pivot pins so that a rivet can be passed through the aligned apertures. The use of a snug fit between the first pivot pin and its bore enables manual manipulation of the first pivot pin for accomplishing the above described alignment.

The same considerations do not apply to the half pins or bushings which extend at right angles to the first pivot pin. These pins are not subjected to equal and opposite forces as is the case for the first pivot pin and, accordingly, each exhibits a distinct tendency to work out of the bearing block. This tendency must be resisted by the rivet passing therethrough. In order to minimize the load on such rivet, it has been the practice to employ a light forced fit between the bushings or half pivot pins in the bores of the bearing block which receive such pins. The use of a forced fit for these half pivot pins presents no particular assembly problem since the needed alignment between the bushings and the aperture of the first pivot pin can still be accomplished by manual manipulation of the first pivot pin. On the other hand, the use of the forced fit for the bushings offers the advantage that tension loading of the rivet is materially reduced.

The foregoing construction has proved adequate for the needs of industry for approximately twenty years and has been employed in many thousands of universal joints sold throughout the world. However, the life of such universal joint is not eternal and it is found that when such universal joints are operated to failure or exhaustion the principal cause of failure is fatigue of the pivot pins and particularly the first pivot pin which passes entirely through the bearing block. Such fatigue can be explained on the basis that the pivot pin is subjected to repeatedly reversed bending loads along its length due to the equal and opposite radial loads applied by the jaws of the coupling member which pivot on said first pin. This repeated reversal of stress is believed the major cause for failure of the patented universal joint construction.

An object of the present invention is to provide an improved universal joint construction wherein the forces which would fatigue the pivot pins of the universal joint pinning construction are resisted in such fashion as to substantially increase the safe fatigue limit.

Another object of the present invention is to provide an improved universal joint pinning construction which substantially eliminates deflection of the coupling members one relative to the other under normal loads.

Still another object of the present invention is to provide an improved universal joint pinning construction which enables the use of tolerances which are less severe than those ordinarily required for comparable assemblies in the prior art.

A further object of the present invention is the provision of a new and improved method of assembling universal joints.

Other objects and advantages reside in the construction of parts, the combination thereof, the method of manufacture and the mode of operation, as will become more apparent from the following description.

In the drawing, FIGURE 1 is a side elevational view of a universal joint assembled in accordance with the present invention.

Figure 1:
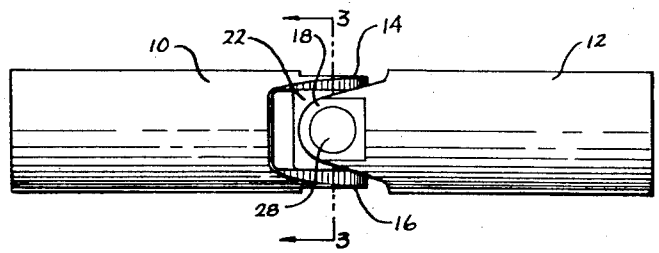

The universal joint illustrated in the drawing includes generally aligned coupling members 10 and 12, each provided with spaced jaws at one end thereof. The coupling member 10 has spaced confronting jaws 14 and 16 and the coupling member 12 has spaced confronting jaws 18 and 20.

The jaws 14 and 16 of the coupling member 10 receive opposite faces of a cubical bearing block 22 therebetween. The jaws 18 and 20 of the coupling member 12 receive an adjacent pair of faces of the bearing block 22 therebetween.

For retaining the bearing block between the several jaws of the coupling members 10 and 12 the bearing block is provided with outwardly projecting pivot pins on the four faces of the bearing block engaged by the several jaws. For assembly of the pivot pins in the bearing block, the bearing block is provided with a first bore 24 extending perpendicularly and centrally between opposite faces thereof and a second bore 26 extending centrally and perpendicularly through the other pair of opposite faces engaged by the jaws of a coupling members. Since the bores 24 and 26 both pass centrally and perpendicularly through faces of the bearing block the bores intersect in the interior of the bearing block and have center lines occupying a common plane. For reasons which become more apparent in the following, the bores 24 and 26 have the same diameter.

One of the bores 24 and 26, for example the bore 26, receives a pivot pin 28, the length of which exceeds the thickness of the bearing block 22. The pin 28, as best appears in FIGURE 2, has diametrically disposed centrally located flats 30 formed thereon. The axial length of the flats 30 is slightly greater than the diameter of the pin 28 and the flats 30 terminate at their opposite ends with rounded ends 32 which merge with the circular periphery of the pin 28.

Passing tranversely through the pin 28 and perpendicularly through the flats 30 is a bore 31, the diameter of which is substantially less than the diameter of the pin 28.

For the practice of the present invention, it is intended that the pin 28 have a heavy forced fit with the bore 26 which receives the pin 28. The terminology "heavy forced fit" is used in conformity with ASA standards, which characterize such fit as involving a "considerable negative allowance." For the present construction, it is preferred that the bearing block 22 and the pivot pins seated therein are of steel composition.

To prepare the pin 28 for a heavy forced fit, various preparations are desirable. Thus, galling is a hazard and an actual contact welding the pin 28 with the material of the bearing block 22 can occur. Scraping or scratching of the parts assembled can also result from sharp edges on the parts assembled.

To prevent galling or contact welding, it is desirable to introduce a dissimilar material between the steel of the pin 28 and the steel of the bearing block 22. For fits of a lesser negative allowance than that involved here, simple lubricants can adequately serve the purpose. However, with a heavy forced fit of the type contemplated herein, the pressures involved would strip the lubricant from the pin 28, such that contact welding and galling would readily occur. For the present invention it is therefore preferred that a dissimilar coating such as a phosphate coating be applied to the pin 28. The phosphate coating is not easily stripped from the pin 28 and, due to its dissimilarity to steel, contact welding is precluded.

To prevent scraping, all surfaces which can come into contact with the interior wall of the bore 26 are rounded to remove all sharp transitions in surface configuration. A process satisfactory for removing sharp surface transitions to the extent required for the practice of the present invention is the process known as "vibratory deburring," wherein a large number of elements of similar size and composition are vibrated together in a common container. The repeated impacts of element upon element serve to round off any sharp transitions in surface configuration without the problem of excessive material removal. The bearing block 22 may be similarly deburred to round off the openings to the bores 24 and 26 therein.

The pin 28, when suitably prepared as described, has a diameter at its circular periphery which is 2 to 4 thousandths of an inch larger than the diameter of the bore 26. The pin 28 is prepared with a 16 or lower microinch (RMS) finish and the walls of the bore 26 are prepared with a 60 or lower microinch (RMS) finish. Thus, the 2 to 4 thousandths oversize in the diameter of the pin 28 is an oversize of a magnitude far exceeding the dimensions of the surface irregularities on the pin 28 and inside the bore 26.

The phosphate coating applied to the pin 28 has a thickness which is in the order of magnitude of 1 to 2 ten thousandths of an inch, this thickness being in addition to the 2 to 4 thousandths oversize of the pin 28.

It is important that the pin 28, when assembled in the bearing block 22, be so positioned that the axis of the bore 31 in the pin 28 coincides substantially with the axis of the bore 24. In the prior art device, wherein the fit between the pin 28 and the bearing block 22 was merely a "snug" fit enabling manual insertion of the pin 28 into the bearing block 22, alignment presented no problem. In the assembly of the present invention, however, which employs a heavy forced fit, the alignment must be perfect from the beginning, since a subsequent adjustment in alignment is precluded by the excessive contact forces that will exist between the bearing block 22 and the pin 28.

Figure 2:
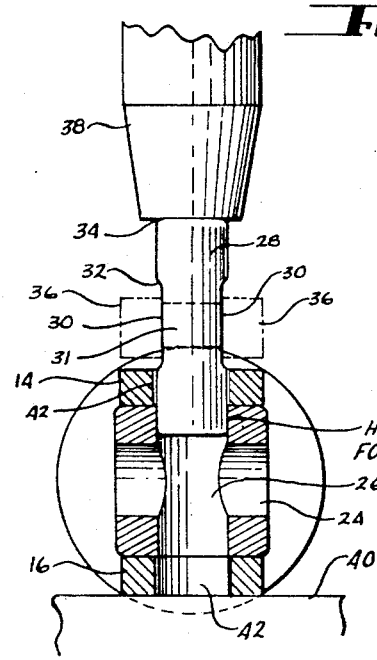
FIGURE 2 is a fragmentary elevational view with a portion shown in phantom, illustrating one step in the assembly of the universal joint of the present invention.
Figure 3:
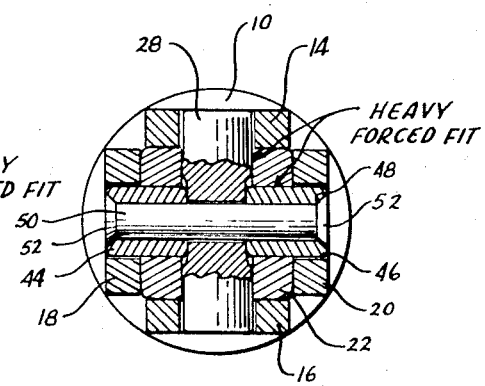
FIGURE 3 is an enlarged sectional view taken substantially along the lines 3—3 of FIGURE 1, with a portion broken away to reveal interior construction.

It is found that alignment problems are overcome in the present invention by employing the assembly technique illustrated in FIGURE 2. In this assembly technique, the bearing block 22 is positioned between the jaws 14 and 16 of the coupling member 10 with the bore 26 aligned with corresponding apertures 42 in the jaws 14 and 16. The jaw 16 is then placed on the platen 40 of a suitable press and the pin 28 inserted through the corresponding aperture 42 in the jaw 14.

At this point suitable guiding fingers 36 are employed to grip the flats 30 on the pin 28. The guiding fingers 36 are part of a jig, not shown, which aligns the assembled coupling member and bearing block within the press, the fingers 36, by engagement with the flats 30, aligning the center line of the bore 31 parallel to the center line of the bore 24.

With the alignment established, the press ram 38 is lowered to force the pin 28 partially into the bore 26. Since the previously described deburring operation will have rounded or tapered the margins of the ends of the pin 28, the movement of the pin 28 into the similarly rounded or tapered ends of the bore 26 proceeds without substantial interference, although the pressures involved are substantial due to the need for an expansion in the diameter of the bore 26 and a contraction in the diameter of the pin 28.

Once the pin 28 has made an entry into thte bore 26, the alignment between the axis of the bore 31 passing through the pin 28 and the axis of the bore 24 is fixed. The fingers 36 are therefore removed from engagement with the flats 30 either manually or by an automatic mechanism which does not require interruption of the downward press movement. With continued lowering of the press ram 38, the pin 28 is driven through the bore 26 until it bottoms against the press platen 40. It is found that this continued movement occurs without any substantial disturbance to the previously established alignment between the axis of the bore 31 and the axis of the bore 24. At the time the pin 28 bottoms against the press platen 40 the foregoing two axes are substantially coincident.

In the drawing, a substantial clearance is illustrated between the cylindrical surface of the pin 28 and the aperture 42 in the jaws 14 and 16 of the coupling member 10. This substantial clearance is shown to emphasize the distinction between the heavy forced fit of the pin 28 within the bearing block 22 and the fit of the pin 28 within the aperture 42, which is preferably a "snug" fit. Thus, while a clearance appears between the pin 28 and the apertures 42 in the jaws of the coupling member 10, the preferred practice of the present invention involves a fit between the pin 28 and the jaws of the coupling member 10 which allows free rotation of the coupling member on the pin 28 with substantially no radial play. Similarly, the bearing block 22 has a "snug" fit between the jaws 14 and 16 of the coupling 10.

The pivot pins for the coupling member 12 comprise tubular half pins or bushings 44 and 46 which are fitted into the opposite ends of the bore 24, also with a heavy forced fit. To accomplish this heavy forced fit, the same preparations as previously described are used. Thus, the pins 44 and 46 are provided with a phosphate coating and subjected to vibratory deburring to round off all sharp edges thereon. Here again, an oversize in the diameter of the pins 44 and 46 amounting to 2 to 4 thousandths of an inch is employed.

Since the requisite alignment for the pivot pin 28 has already been established, it is only necessary to press the pins 44 and 46 into the opposite ends of the bore 24 until these pins bottom against the flats 30 formed on the pin 28. With this operation, alignment between the interior passages or bores in the pins 44 and 46 and the bore 31 in the pin 28 is automatic.

In the preferred construction, the pins 44 and 46 are countersunk as shown at 48, the countersinks appearing in the outer ends of the pins 44 and 46. The universal joint assembly is completed by passing a pin 50 having a snug fit through the bores in the pins 44 and 46 and upsetting the ends 52 thereof into the countersinks 48.

To minimize the opportunity for interference to insertion of the pin 50 resulting from minor misalignment between the bore 31 of the pin 28 and the bores and the pins 44 and 46, the bore 31 is slightly oversized with respect to the diameter of the pin 50, this oversize amounting to 5 to 10 thousandths of an inch.

As was the case with the coupling member 10, the jaws 18 and 20 of the coupling member 12 have a "snug" fit between the apertures 42 therein and the pins 44 and 46, and have a "snug" fit between the jaws 18 and 20 thereof and the faces of the bearing block 22 received therebetween.

Due to the heavy forced fit between the pivot pins of the present pinning construction and the bearing block 22, the pivot pins and the bearing block act as a unitary structure. Each of the pivot pins is held so tightly within its bore in the bearing block 22 that each of the pins, particularly the pin 28, is relieved of bending stresses. Thus, even though the opposite ends of the pin 28 may be subjected to a bending moment, the pin is held so tightly within the block 22 that the stresses associated with these bending moments are taken up in the body of the block. This being the case, the pin 28 itself is not subjected to a reversal of stresses such as will produce fatigue in the pin 28.

Since the block 22 and the several pivot pins therein function as one unit, backlash between the coupling members 10 and 12 is substantially reduced. In all universal joints there is some backlash between the coupling members due to a clearance between the pivot pins and the jaws of the coupling members. In universal joints such as the patented joint previously described, the backlash is enlarged because of the clearance between the pin 28 and the bearing block 22 and additionally because of a possible deflection between the coupling members under high loads resulting from bending of the elongate pin which passes through the bearing block with only a snug fit. However, the present construction eliminates clearance between the pin 28 and the bearing block 22 and also substantially eliminates the possibility of bending of the pin 28. Accordingly, backlash under normal loads is reduced to that allowed by the snug fit between the pivot pins and the apertures 42 in the jaws of the coupling members.

As previously mentioned, the bores 24 and 26 in the bearing block 22 are preferably of the same diameter. This has not been the case with devices manufactured under the aforementioned Patent No. 2,369,810 since, in those devices, the pin analogous to the pin 28 had a slip fit in its bore, whereas the transverse half pins had light formed fits in their bores. By employing a heavy forced fit for all pivot pins in accordance with the present invention, the bores 24 and 26 are conveniently of the same diameter, thus simplifying manufacturing procedures.

A more substantial benefit to the persent construction resides in a relaxation of tolerances permitted by the present construction. Thus, the tolerances required for a suitable "snug" fit such as employed in the patented prior art structure are quite rigid, the tolerance being in the range of 2 to 5 ten thousandths of an inch. With a heavy forced fit of the type used in the present invention, a tolerance in the range of 2 to 4 thousandths of an inch in the diameters of the pivot pins and their bores is adequate for proper assembly of the universal joint. Thus, the present construction permits a relaxation of tolerances associated with the pin diameters and the bore diameters by a factor of 10.

In the manufacture of universal joints in accordance with the present invention, disassembly of the universal joint is not contemplated. However, during assembly or test of the universal joints, it is sometimes desirable to remove one or more of the pivot pins which have been anchored in the bearing block 22 by the heavy forced fit. To facilitate such disassembly, the flats 30 on the pins 28 have rounded ends 32 which merge with the circular periphery of the pin 28. By removal of the pin 50 and, thereafter, by application of a sufficient axial force to the pin 28, the rounded ends 32 in the pin 28 can operate as cams to drive the pins 44 and 46 outwardly a sufficient distance to free the pin 28. With removal of the pin 28, it becomes possible to drive the pins 44 andn 46 out of the bearing block by means engaging the inner ends of such pins.

As previously described, the pins 44 and 46 and the pin 28 have been treated by vibratory deburring to remove all sharp angles thereon. This treatment, in addition to facilitating assembly of the universal joint, facilitates the above described disassembly technique. Thus, the ends 32 of the flats 30, being rounded, act against the rounded margins of the pins 44 and 46 with a minimum of galling or scraping between the pins 28, 44 and 46.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. In the method of assembly of a universal joint pinning construction, said construction including a block having first and second mutually perpendicular and intersecting bores therethrough, and a pin having a bore therethrough transverse to the longitudinal axis thereof, said pin having a diameter larger than the diameter of said first bore, the steps of supporting said pin in substantial axial alignment with said first bore and at a fixed position of rotation about its own axis wherein the axis of said bore through said pin is substantially parallel to the axis of said second bore, pressing said pin a short distance into said first bore while maintaining the support thereof, releasing the support of said pin, and thereafter pressing said pin further into said first bore to align said bore through said pin coaxially with said second bore.

2. The method of claim 1 further including the step of applying a phosphate coating to said pin prior to the forementioned step of supporting said pin.

3. The method of claim 1 further including the step of rounding the ends of said pin by vibratory deburring prior to the aforementioned step of supporting said pin.

4. The method of claim 1 wherein said block is supported adjacent a fixed surface confronting the end of said first bore opposite the end thereof into which said pin is first pressed and wherein said step of pressing said pin continues until said pin engages said fixed surface.

5. In the method of assembly of a universal joint pinning construction, said construction including a block having first and second mutually perpendicular and intersecting bores therethrough, a pin to be inserted into said first bore, said pin having surfaces to be aligned with said second bore requiring that said pin have a fixed position of rotation about its own axis within said first bore and said pin having a maximum diameter greater than the diameter of said first bore, and a coupling member having a pair of jaws with an aperture therein adapted to receive said first pin with a snug fit, the steps of supporting one of said pair of jaws on a fixed surface, supporting said block between said jaws and with said first bore aligned with said aperture in said pair of jaws, supporting said pin in substantial axial alignment with said first bore and at said fixed position of rotation about its own axis, advancing said pin through the other of said pair of jaws and a short distance into said first bore while maintaining the support thereof, releasing the support of said pin, and thereafter further advancing said pin into and through said first bore and through said one of said pair of jaws until said pin engages said fixed surface.

References Cited

UNITED STATES PATENTS

| | | | |
|---|---|---|---|
| 1,382,958 | 6/1921 | Daniels | 64—17 |
| 2,369,810 | 2/1945 | Stillwagon | 29—526 |
| 2,517,497 | 8/1950 | Lauenstein | 29—446 |
| 2,530,934 | 11/1950 | Barton et al. | 29—525 X |
| 2,636,254 | 4/1953 | Gunning | 29—525 |
| 3,142,901 | 8/1964 | Bodine | 29—525 |
| 3,230,617 | 1/1966 | Spiess et al. | 29—434 |

THOMAS H. EAGER, *Primary Examiner.*

U.S. Cl. X.R.

29—525; 64—17